March 8, 1955 W. ANDERSON 2,703,555
CALF WEANER
Filed Sept. 1, 1953
Fig. 1.
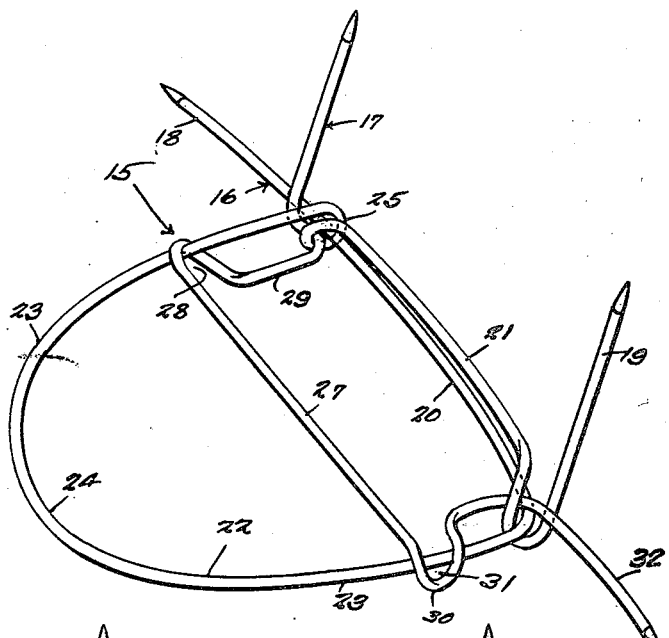
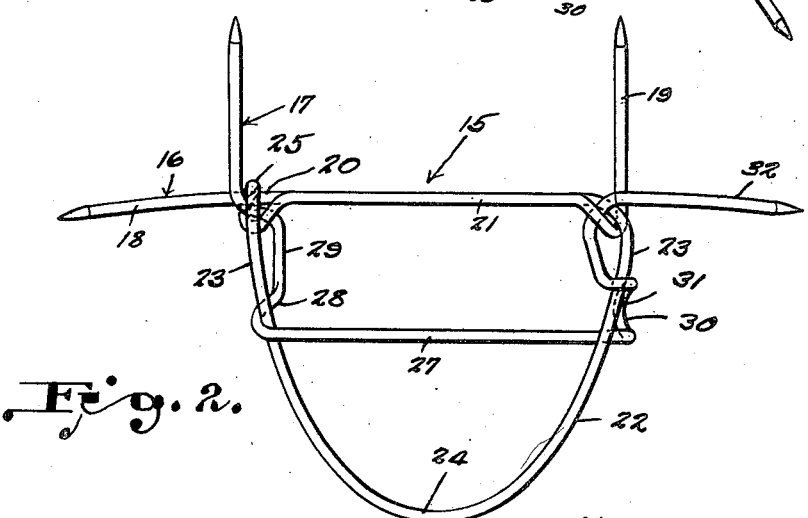
Fig. 2.
William Anderson
INVENTOR
BY C. A. Snow & Co.
ATTORNEYS.

ns2,703,555
Patented Mar. 8, 1955

2,703,555
CALF WEANER
William Anderson, Boyceville, Wis.

Application September 1, 1953, Serial No. 377,939

3 Claims. (Cl. 119—132)

This invention relates to a weaning device to be used by calves, colts or other young animals to prevent them from sucking during the time of weaning.

It is an important object of this invention to provide a weaning device of the kind to be particularly described hereinafter which is formed of a pair of interengaging wires for the animal when the weaning device is applied and the ends of the wires are extended from the device for prodding the animal from whom the animal having the device is being weaned.

It is another object of this invention to provide an animal weaning device of this kind which may be readily formed from wire bent to the desired shape and at an economical cost by farmers or ranchers having use for weaning devices.

Other and further objects and advantages of the invention will be hereinafter described and the novel features thereof defined in the appended claims.

In the drawings:

Figure 1 is a perspective view of a weaning device constructed according to an embodiment of my invention.

Fig. 2 is a to plan view of the weaning device.

Referring to the drawings the numeral 15 designates generally a weaning device for weaning a young colt or calf from its mother at an early stage.

While similar weaning devices have been employed in the past for weaning the young animal away from the older animal, the present invention is made up of a pair of elongated wires 16 and 17 sharpened at their opposite ends to form prongs and bent intermediate their ends to provide for the interengagement of the two wires 16 and 17 and the prongs at the ends of the wires.

The wires 16 and 17 provide for the formation of the weaning device 15 at a low price and without the use of particular tools so that the two wires may be bent to the desired shape by a farmer or rancher having use for a weaning device 15.

One of the wires, as the wire 16 is adapted to be extended transversely of the animal with which the device 15 is to be used and includes a longitudinally extending bar 20 extending transversely of the animal using the device 15. The wire 16 is then bent to provide a second bar 21 longitudinally of the transverse body of the animal and parallel to the first bar 20 and spaced upwardly therefrom, and the bars 20 and 21 are connected together by the wire 16 being bent intermediate the length thereof to provide a U-shaped connecting member 22 having side arms 23. One of the side arms 23 is formed on or connected to one end of the bar 20 and the other side arm 23 is connected to or formed integral with the second bar 21 so that the bars 20 and 21 are biased together by the connecting member 22 through the U-shaped arcuate bight 24 connected between the ends of the side arms 23 remote from the bars 20 and 21. A loop 25 is formed on one end of the side arm 23 of the connecting member and is loosely disposed about the bar 20 so that the bar 20 is free for axial movement in the loop 25.

The prong 18 is formed on one end of the wire and one end of the horizontal bar 20 with the prong 18 extending from the weaning device 15 in a horizontal plane and the other end of the wire 16 is formed with a second prong 19 extending from the weaning device 15 in a plane perpendicular to the plane of the prong 18.

The second wire 17 is engaged with the first wire 16 and formed for locking engagement therewith. The wire 17 is bent to form a longitudinally extending tie bar 27 for engagement between the side arms 23 of the connecting member 22 and one end of the tie bar 27 is provided with a U-shaped notch 28 with a connecting arm 29 extending at right angles to the tie rod 27 and the end of the connecting rod 29 remote from the notch 28 is bent at right angles to the connecting rod and extends through the loop 25 in a plane with the prong 18. The connecting rod 29 is then bent at right angles to the prong 18 and extends upwardly in a plane perpendicular to the horizontal plane of the prong 18.

The other end of the tie rod 27 is bent to form a depending hook 30 having an upwardly opening notch 31 therein and outwardly of one of the side arms 23 as clearly shown in Fig. 1 of the drawings. The tie rod 27 is then formed with a horizontally extending outer prong 32 at the end thereof remote from the prong at the first end of the length of wire from which the tie rod 27 is formed.

When the weaning device 15 is applied to an animal, the weaning device may be secured to the animal by usual means, not shown in the drawings, and a pair of prongs will extend in a horizontal direction forwardly of the animal and another pair of prongs, as the prongs 18 and 32, will extend outwardly of the animal in a horizontal plane so that the prongs may engage an animal from whom the first animal is being weaned.

While the specific details of one embodiment of this invention have been herein shown and described, the invention is not confined thereto as changes and alterations may be made without departing from the spirit and scope thereof as defined in the appended claims.

I claim:

1. A weaning device of the kind described comprising a horizontally extending bar, a prod on one end of said bar and extending outwardly from said device, a loop engageable about said bar, a horizontally extending curved connecting member between said loop and the other end of said bar, a second bar connected to said loop and extending parallel to and spaced from said first mentioned bar, and a second prong on said second bar extending in a plane perpendicular to the plane of said first mentioned prong, a tie bar on said device comprising a longitudinally extending rod parallel to and spaced from said bars, and engageable adjacent its opposite end with said connecting member, one end of said rod being engageable through said loop and extending perpendicular and parallel to said second prong, the other end of said rod extending outwardly of said device in a direction opposite to and in a horizontal plane parallel to the plane of said first prong.

2. A weaning device of the kind described comprising a length of wire bent upon itself to form a first bar extending horizontally of said device, a prong on one end of said bar and extending from said device in a horizontal plane, a reversed connecting member connected at one end to the other end of said bar, a loop about said bar adjacent said prong and connected to the other end of said connecting member, a second bar connected at one end to said loop and extending parallel to and spaced from said first bar, a notch on the other end of said second bar and a second prong extending from said notch and said second bar in a plane perpendicular to the plane of said first mentioned prong, a second length of wire disposed upon itself and engageable with said first length of wire comprising a horizontally extending tie rod, one end of said tie rod having a notch within which said connecting member is engaged and said tie rod remote from said notch extending through said loop, a third prong on one end of said tie rod and extending from said device in a plane parallel to the plane of said second prong, a fourth prong on the other end of said tie rod and extending outwardly of said device in a direction opposite to said first prong.

3. A weaning device as set forth in claim 2 including a hook on said tie rod between the other end of said tie rod and fourth prong, said connecting member being engageable in said hook.

References Cited in the file of this patent

UNITED STATES PATENTS

| 244,792 | Brunny | July 26, 1881 |
|---|---|---|
| 280,642 | Marvin | July 3, 1883 |
| 610,944 | Merry | Sept. 20, 1898 |
| 642,847 | Hughes | Feb. 6, 1900 |
| 1,306,590 | Gorseth | June 10, 1919 |